Arthur M. Allen's Imp.t in Velocipedes.

103957        PATENTED JUN 7 1870

Witnesses:
C. Wahlers
E. F. Kastenhuber

Inventor:
Arthur M. Allen
By Van Santvoord & Hauff
his Attys

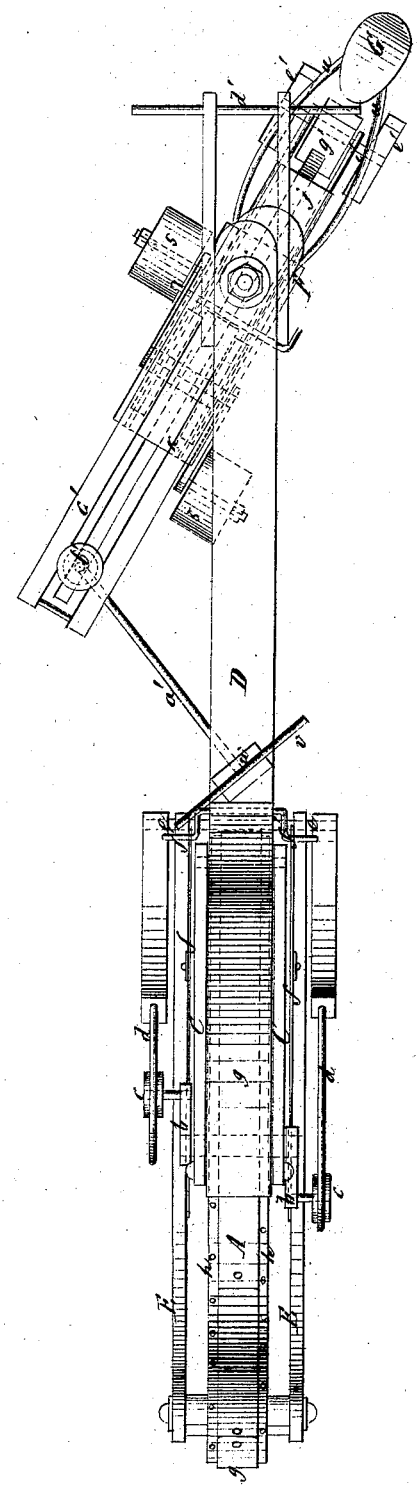

ARTHUR M. ALLEN, OF NEW YORK, N. Y.

Letters Patent No. 103,957, dated June 7, 1870.

IMPROVEMENT IN VELOCIPEDES.

The Schedule referred to in these Letters Patent and making part of the same.

To all whom it may concern:

Be it known that I, ARTHUR M. ALLEN, of the city, county, and State of New York, have invented a new and useful Improvement in Velocipedes; and I do hereby declare the following to be a full, clear, and exact description thereof, which will enable those skilled in the art to make and use the same, reference being had to the accompanying drawing forming part of this specification, in which drawing—

Figure 4 is a plan or top view of the same.

Similar letters indicate corresponding parts.

Figure 1:
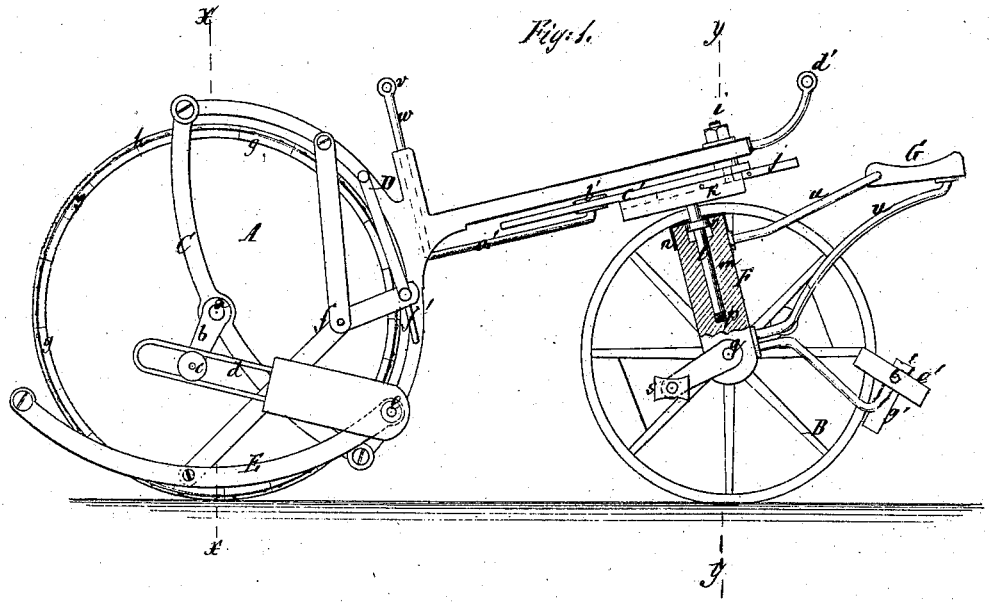
Figure 1 represents a side elevation of this invention.
Figure 2:
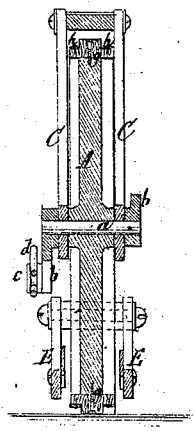
Figure 2 is a transverse section of the same, the line x x, fig. 1, indicating the plane of section.
Figure 3:
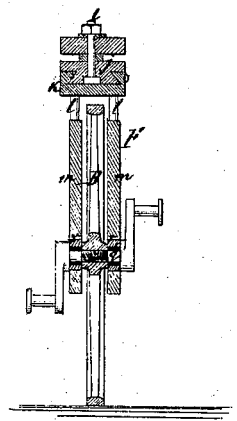
Figure 3 is a similar section of the same, taken in the plane indicated by the line y y, fig. 1.

This invention relates to a velocipede having two or more wheels, one behind the other, each wheel being provided with its own driving-gear, and with seats for the operators behind and attached to each wheel. In this instance the velocipede is steered by the hind wheel, and the front wheel is largest, but it may be made to steer by the front wheel with the hind wheel the largest, in which case the large hind wheel may be used as the only driving-wheel and the front rider only need steer.

In steering this velocipede, if the front rider operates the steering mechanism the hind rider holds onto the handles and allows himself to be turned with the wheel by the front rider, or he may steer by swinging his body and the wheel while holding the handles, the front rider allowing his steering mechanism to follow the motion of the hind wheel.

Instead of the hind rider steering this way his seat may be attached to the frame of the front wheel and, he may turn the hind wheel by the standard in the same manner in which the front wheel of ordinary bicycles is turned.

The joint in the reach of this velocipede is placed behind the hind wheel, so that, when steering and running on a curve, the rider is carried somewhat to the inside of the curve, and the necessity of leaning over is avoided. This joint may be adjusted to suit persons of various weights, by means of a slide in the head of the standard, and a pin or screw for the purpose of securing the slide in any position.

The arms of the standard-fork run into two sleeves which carry the bearings for the axle at their lower ends, each arm of the fork resting on an elastic cushion placed at the bottom of the holes, thereby making a suitable spring for the frame, and avoiding much of the jar now encountered.

The arms of the fork are prevented from jumping out of their sleeves by collars fastened on them, and by straps embracing them loosely over said collars and fast to the sleeves. The sleeves may be kept from turning sideways on the fork by key-ways or other suitable means.

Another elastic cushion is placed around the bearing of the axle, thereby giving additional safety against rough wear and tear.

The shaft of the driving-wheel is made in two parts and screwed from opposite sides into the hub, the part on the right hand having a right-hand screw-thread, and the one on the left having a left-hand screw-thread, so that each part is kept tight by the pressure of the driving-gear; but, if desired, a set-screw may be put through the hub into the end of each part of the shaft. By this mode of making the shaft, each crank, with its part of the axle and with its shoulder for locking up against the hub, may be made complete by itself before putting it into the wheel, the bearing being made whole and inserted into the center of the elastic cushion in the standard or its sleeve, and the axle put through it, and the crank revolved till it locks up against the hub, thereby producing an arrangement which can always be adjusted and cleaned without requiring any wrenches or tongs, all nuts and bolts about the bearings being done away with.

The treads of the pedals on the cranks are made concave so as to give a better hold to the foot. The foot-brake, which in this case is used by the hind rider, is so constructed that it acts also as foot-rest, and, when adjusted with a light spring, as a scraper.

To the rim of the driving-wheel are secured two weights, slightly behind the cranks, whereby the steadiness of the machine is materially increased and the rider is enabled to keep the same on a straight line. The slipping of the driving-wheel on the ground is prevented, a high speed is more easily obtained than by carrying a continuous heavy tire, and the machine can be propelled through mud and sand, and up hill, with less expenditure of force than it can if the weights are omitted. By changing these weights for others the machine may be made to suit persons of less or more power.

The steering-gear is constructed of two horizontal levers or bars, one being attached to the lower end of the steering-post and the other to the standard or frame of the steering-wheel, the two levers being connected either by a roller-stud secured in one and catching in a slot in the other lever, or simply by a link, in such a manner that the steering mechanism is simplified, and the motion of the steering-post is transmitted by positive means to the standard or frame of the steering-wheel.

The tires of the wheels are made of end-grain wooden blocks or segments, having shoulders, to which two light metallic straps or bands are secured. The wooden tire-blocks are fastened to the fellies by screws passing through them and entering the fellies, or by dowel-pins projecting from the fellies and entering into holes in the under sides of the tire-blocks. The treads of the blocks are scored across, so as to get a better hold of the road in going up hill.

The driving-gear, instead of being constructed of simple foot-cranks, consists of a slotted bar having a small roller traveling in its slot, said roller being bored out to receive the crank-pin in such a manner that, by imparting to the slotted bar an oscillating motion, either by hand or foot-power, or by both combined, the driving-wheel is caused to revolve with the least possible loss of power by friction.

The brakes, which may be properly termed road-brakes, consist of bars secured one on each side of the machine, and hinged so that they may be depressed to the road-level by toggle-levers or other suitable means, and that, by lifting the wheel clear of the road, and causing the entire weight of the driving-wheel to bear and slide on the road-brakes, the motion of the machine can be stopped quickly, effectually, and without danger of upsetting. These road-brakes may be operated by hand or foot, either one or both hands or feet operating both sides at once, and they may be subjected to the action of a spring which serves to lift the same out of the way when they are not used.

In the drawing—

The letter A designates the front wheel of my velocipede, and the letter B the hind wheel.

The front wheel is mounted on an axle, $a$, which has its bearings in curved bars C, which are firmly connected to the outer or front ends of the reach D.

On the ends of the axle $a$ are mounted the cranks $b$, the crank-pins of which are inserted into rollers or slides $c$ traveling in or on bars $d$, as shown in fig. 1.

These bars are connected by pivots $e$ to the reach, or to brackets which are rigidly connected to the reach, so that an oscillating motion can be imparted to them either by hand or foot-power, or by both combined.

By thus imparting to the slotted bars $d$ an oscillating motion the wheel A is caused to revolve, and very little power is lost by friction, all the parts of the driving-gear being so constructed that the friction is reduced to a minimum.

The pivots $e$ also form the fulcrums for the road-brakes E, which are constructed of two curved bars attached to the pivots $e$, and connected together at their outer loose ends by a cross-brace, so that they can be raised from, or depressed to, the ground, as may be desired. These road-brakes are operated by toggle-levers $f$, to which the required motion is imparted by hand or foot, and, by depressing said brakes upon the road with sufficient power, the wheel is raised, and the entire weight of the same is thrown on the brakes, thereby stopping the machine quickly, and without danger of upsetting the same.

With the toggle-levers are combined foot-pedals $f'$, so connected to the same that, by operating either one, both sides of the road-brake are uniformly depressed.

The tire of the wheel A is constructed of a series of end-grain wooden segments, $g$, which are fastened to the fellies by screws or dowel-pins, and by means of two straps, $h$, which embrace shoulders formed on both sides of the tire-blocks, and are fastened to the same by spikes, screws, shrinking on, or any other suitable means.

The faces or treads of the tire-blocks are scored, to increase their hold on the ground.

The reach D extends back beyond the standard F of the hind wheel B, and through its rear end extends a pivot or king-bolt, $i$, which is firmly secured in a slide, $j$, fitted into a dovetailed block, $k$, which forms the head of the standard F.

By placing the joint of the reach back of the hind wheel, the rider, when steering, is carried somewhat inside the curve, and the necessity for leaning over is avoided, and, by moving the slide $j$ back and forth in the block $k$, the hind wheel is moved toward or from the king-bolt $i$, and the machine is adjusted for different weights.

The slide $j$ is fastened in the block $k$ by a pin or set-screw, or any other suitable means.

The standard F is composed of two rods or arms, $l$, which extend from the block $k$, and are fitted into sleeves $m$, being retained therein by straps $n$, which catch over the arms, and bear on collars $o$, attached to said arms, said straps being fastened to the sleeves, as shown in fig. 1 of the drawing.

The arms $l$ rest upon elastic cushions $p$, placed in the sockets of the sleeves $m$, so as to form springs, and to reduce the jar of the machine.

The sleeves $m$ form the bearings for the axle $q$, and these bearings consist of boxes passing through the sleeves, and inclosed, each, in an elastic cushion, $r$, whereby additional safety against rough wear and tear is effected.

The axle $q$ is made in two parts, each part being provided with a screw-thread—the right-hand part with a right-hand, and the left-hand part with a left-hand thread—so that they can be screwed from opposite sides into the hub of the wheel, which is provided with corresponding internal threads.

Each part of the axle, with its crank, can thus be finished separately, and fastened in the required position without trouble; and, as the machine is propelled, the power, acting on the cranks, serves to keep secure the parts of the axle, while, by turning the cranks in the opposite direction, the axle can be readily taken out, for the purpose of cleaning or repairing.

The bearings or axle-boxes can be made of one piece, without screws or bolts, and much time and labor are saved in the construction of the machine, and in keeping the same in proper order. By this arrangement, also, a clean, snug fit of the sleeves between the shoulders on the shaft and the hub can be always secured by means of washers.

The pedals $s$ on the cranks are made concave, so as to give a good hold to the foot.

To the rim of the driving-wheel B are secured weights $t$, slightly in the rear of the foot-cranks, so that, at the moment the power of the foot is brought on one of the cranks, one of the weights is in the most favorable position to impart to the wheel the required momentum.

By using these weights, the steadiness of the machine when in motion, and the adhesion of the wheel to the road, are materially increased.

The machine can be run with comparative ease through mud, sand, or up-hill, and a high speed can be maintained, and less power is needed than when using a continuous heavy tire of the same weight.

The weights are made removable, so that they can be changed to suit persons of less or more power.

My velocipede is constructed for two riders, one being situated on the reach behind the front wheel, and the other on a seat, G, supported by braces $u$, extending from the hind-wheel standard, so that said seat is situated behind the hind wheel, as shown in fig. 1 of the drawing, each of the wheels being provided with its own distinct driving-gear, so that both riders can assists in propelling the machine.

The machine is steered by the tiller $v$, secured in the steering-post $w$, to the lower end of which is secured a lever, $a'$, carrying a roller-stud or slide, $b'$, which catches in a slotted lever, $c'$, secured to the hind-wheel standard F; or, if desired, the levers $a'$ and $c'$ may be connected simply by a link at right angles to them, or nearly so.

By turning the tiller, the hind wheel, with its standard, and with the seat G, are turned, the rider occupying this seat holding onto the handle *d'*, which is secured to the reach, and allowing himself to be turned with the hind wheel. If desired, however, the rider occupying the seat G may steer by swinging his body and the wheel while holding the handle *d'*; and, in this case, the front rider will allow his steering mechanism to follow the motion of the hind wheel.

The seat of the hind rider might, however, be also attached to the frame of the front wheel, or to the reach; and, in this case, he may turn the hind wheel by the standard in the same manner in which the front wheel of ordinary bicycles is turned.

The foot-rest of the hind rider consists of two foot-pieces, *e'*, which are mounted on a rock-shaft, *i'*, on which is also secured a shoe, *g'*, so that, by turning the feet down in the proper direction, the shoe can be brought to bear on the circumference of the wheel, and made to act as a brake.

What I claim as new, and desire to secure by Letters Patent, is—

1. The seat in the rear of the hind wheel, supported by brackets, when combined with the driving-gear of the hind wheel and its standard, and operating as herein described.

2. The handle *d'*, secured to the frame of the front wheel, in combination with the seat, secured to brackets extending from the hind-wheel standard, substantially as described.

3. In a velocipede having one wheel behind the other, the arrangement of a joint in the reach behind both the front wheel and the top of the hind wheel, substantially as shown and described.

4. The arrangement, in a velocipede, of a slide and groove block, forming an adjustable connection between the reach and standard, substantially as described.

5. The fork *l* and sleeves *m*, composing the standard F, as described.

6. The elastic cushions *p*, in combination with the fork *l* and sleeves *m*, composing the standard, substantially as set forth.

7. The elastic cushion surrounding the sleeves or bearings *m* of the axle, when combined and arranged with the frame or standard of a velocipede.

8. The axle of the driving-wheel of a velocipede, constructed of two parts, which are secured in the hub of the wheel by right and left-hand screw-threads, as set forth.

9. The foot-brake, composed of pedals and a shoe mounted on a rock-shaft, as described, so that it can be used either as a foot-rest, a foot-brake, or a scraper.

10. The arrangement of detachable weights, in combination with the driving-wheel of a velocipede, substantially as set forth.

11. The arrangement of the lever extending from the steering-post, and connected to the lever extending from the steering-wheel by a slot or its equivalent, and operating as herein shown and described.

12. The metallic straps, in combination with the tire formed of end-grain wooden blocks, provided with shoulders to receive said straps, one on each side, substantially as set forth.

13. The oscillating lever, in combination with a roller or slide, mounted on the crank-pin of the driving-wheel of a velocipede, and operating together substantially as described.

14. The hinged road-brake, in combination with the frame of a velocipede, for the purpose set forth.

15. The toggle-levers, in combination with the hinged road-brake, substantially as described.

16. The foot-pedals, in combination with the levers operating the road-brake, and so connected to them that, by actuating the lever on one side, both sides of the road-brake are depressed with a uniform pressure, as set forth.

This specification signed by me this 21st day of March, 1870.

ARTHUR M. ALLEN.

Witnesses:
C. WAHLERS,
E. F. KASTENHUBER.